United States Patent [19]
Sommer

[11] Patent Number: 5,833,210
[45] Date of Patent: Nov. 10, 1998

[54] BRAKE AND CLUTCH CONTROL SYSTEM

[75] Inventor: Gordon Maurice Sommer, Grosse Pointe Farms, Mich.

[73] Assignee: Midwest Brake Bond Company, Warren, Mich.

[21] Appl. No.: 802,373

[22] Filed: Feb. 19, 1997

Related U.S. Application Data

[62] Division of Ser. No. 425,816, Apr. 20, 1995, Pat. No. 5,651,436.

[51] Int. Cl.$^6$ ...................... F16K 31/122; F16K 31/126; B60I 15/22
[52] U.S. Cl. ...................... 251/61.4; 251/63.4; 251/63.6; 303/68; 303/71
[58] Field of Search ............................ 251/43, 44, 61.4, 251/63.4, 63.5, 63.6; 303/68, 71

[56] References Cited

U.S. PATENT DOCUMENTS

| | | | |
|---|---|---|---|
| 552,707 | 1/1896 | Himler | 303/68 |
| 1,623,431 | 4/1927 | McVoy | 251/63.4 |
| 1,707,259 | 4/1929 | Farmer | 251/63.4 |
| 1,921,551 | 8/1933 | Temple | 251/61.4 |
| 3,840,281 | 10/1974 | Huber et al. | 303/68 |
| 3,845,932 | 11/1974 | Fontaine | 251/63.4 |
| 4,153,074 | 5/1979 | Risk | 251/63.4 |
| 4,307,654 | 12/1981 | de Almeide | 251/63.4 |
| 4,407,548 | 10/1983 | Graham | 251/61.4 |
| 4,456,109 | 6/1984 | Bottomley et al. . | |
| 4,484,668 | 11/1984 | Williamson, Jr. | 303/68 |
| 4,580,674 | 4/1986 | Weber . | |
| 4,606,340 | 8/1986 | Ansite | 251/63.4 |
| 4,909,279 | 3/1990 | Nakamura et al. | 251/63.4 |

Primary Examiner—George L. Walton
Attorney, Agent, or Firm—Harness, Dickey & Pierce, PLC

[57] ABSTRACT

A control system for a press having a clutch and a brake includes a clutch control valve and a brake control valve. The clutch control valve operates the clutch by supplying pressurized air to the clutch. The brake control valve operates the brake by supplying pressurized hydraulic fluid to the brake. The brake control valve is activated by pressurized fluid from the clutch control valve in order to insure simultaneous release of the brake with engagement of the clutch as well as simultaneous application of the brake with disengagement of the clutch.

6 Claims, 3 Drawing Sheets

BRAKE AND CLUTCH CONTROL SYSTEM

This is a division of U.S. patent application Ser. No. 08/425,816, filed Apr. 20, 1995 now U.S. Pat. No. 5,651,436.

FIELD OF THE INVENTION

The present invention relates to a control system for a press incorporating a clutch and a brake. More particularly, the present invention relates to a unique control valve which operates to reduce and/or eliminate any overlap which might occur between the simultaneous engagement of the clutch and the release of the brake or the simultaneous disengagement of the clutch and the application of the brake.

BACKGROUND OF THE INVENTION

Presses incorporating a brake and a clutch to control the operation of a crankshaft are well known in the art. Presses of this type generally have the crankshaft intermittently driven through the clutch from a continuously running flywheel, or gear. The crankshaft of the machine may be operated in several different ways, depending on the manner in which the press is being used and the type of work it is performing, but the mode of operation most generally employed is to intermittently drive the crankshaft through one cycle, stopping it at the same point after each cycle of movement. The operation of the crankshaft is controlled by the clutch which connects and disconnects the crankshaft and the flywheel as desired, and a brake which stops the movement of the crankshaft when the clutch is disengaged. The control of the clutch and brake are interconnected in such a manner that the brake will be released simultaneously with the engagement of the clutch and vice versa. The operation of the clutch and brake is controlled by a suitable hydraulic and/or electric apparatus which is operated manually or automatically to effect the engagement of the clutch and the release of the brake and is normally operated automatically to effect the disengagement of the clutch and the application of the brake.

Some designs for these presses utilize air pressure to activate dry-friction brakes and clutches for the purposes of cycling the press. One problem which has occurred in these dry-friction, air operated brakes and clutches is that there has been excessive trouble with the dry-friction brake while only minimal trouble with the dry-friction clutches. One of the reasons that the dry-friction clutches will perform quite well and the dry-friction brakes will not lies in the design of the clutch and the brake. Clutches are normally designed and sized to produce the rated tonnage of the press. Brakes, on the other hand, are designed and sized to stop the press. Thus, the clutches are normally designed to be significantly larger than the brakes. This means that the clutches have more disc friction area available to dissipate the heat caused by starting than the brakes have for stopping the press. Since the same press inertia is present in the clutch and the brake function, the same amount of heat needs to be dissipated when starting or stopping the machine. This leads to a significantly shorter life for the brakes than for the clutches.

Another problem in the clutch and brake design for these presses is the clutch and brake overlap. Even though the clutch and the brake are operated simultaneously, there are still times when the clutch starts to engage before the brake is released and vice versa. The clutch is normally engaged by air pressure and is disengaged by springs. The rated torque or full engagement of the clutch is typically reached with 70–80 psi of air pressure. Engagement of the clutch usually begins at approximately 10 psi of air pressure due to the air pressure beginning to overcome the load exerted by the springs. The brake is normally applied by springs and released by air pressure. The release of the brake typically begins with approximately 40 psi of air pressure due to the fact that the springs must exert sufficient load to apply the brake. This function is opposite for the clutch where the springs are only required to separate the plates for disengagement of the clutch. The time it takes for the air pressure to build from 10 psi to 40 psi on starting is the starting overlap. The time it takes to exhaust air from 40 psi to 10 psi on stopping is the stopping overlap. When the clutch torque reaches a point that it is significantly larger than the brake torque, the clutch will quickly overpower the brake on starting and overpower the brake on stopping providing the starting and stopping overlap. These overlaps cause overheating of the brake and rapid disc wear for the brake friction plates.

Accordingly, there is a need for a brake and clutch control system which is starting and stopping of the machine. The control system should be as simple as possible, low cost and be capable of being retro fitted onto existing presses at the time of brake replacement.

SUMMARY OF THE INVENTION

The present invention provides the art with a unique control system which allows the replacement of a dry-friction brake with a hydraulically activated oil shear brake. The control of the clutch and the brake is replaced with a system which utilizes a unique control valve to eliminate the overlap between the engagement of the clutch and the release of the brake as well as the overlap between the application of the brake and disengagement of the clutch. The unique valve is designed to control the hydraulic fluid being used to release and apply the brake in response to the air pressure being applied to engage and disengage the clutch. In addition, the unique valve maintains a minimum amount of hydraulic fluid pressure within the brake at all times to enable the fine tuning of the harshness of the operation of the press and to insure that air will not be introduced into the hydraulically operated brake once the air has been bled from the system.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
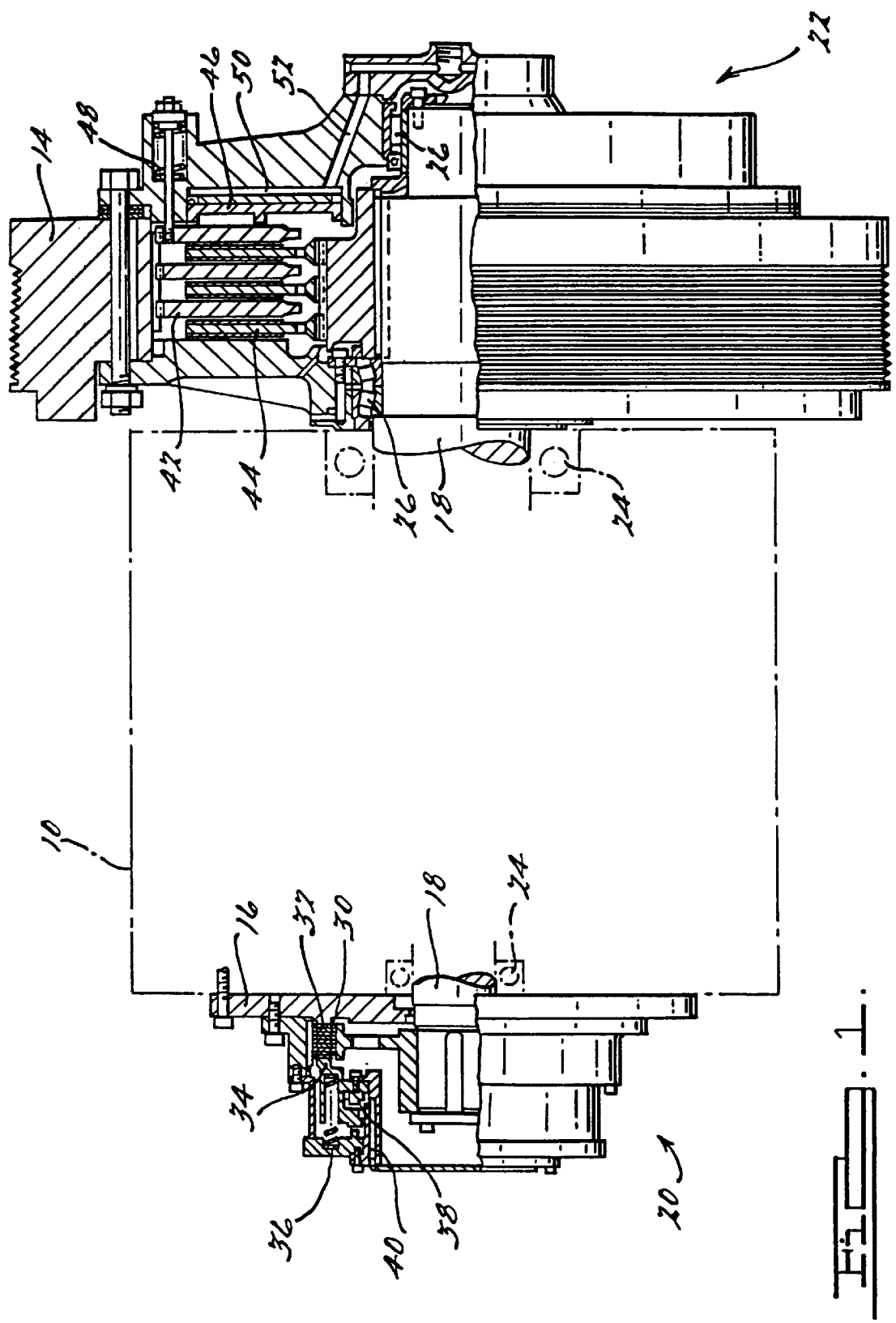
FIG. 1 schematically illustrates a press incorporating a brake and clutch which are controlled using the control system according to the present invention.

Referring now to the drawings in which like reference numerals designate like or corresponding parts throughout the several views, there is shown schematically in FIG. 1 a press 10 incorporating a rotatable flywheel 14, a fixed member 16, a rotatable crankshaft 18, an oil-shear brake assembly 20 and a clutch assembly 22. Crankshaft 18 is rotatably supported by a pair of bearings 24 and flywheel 14 is rotatably supported by a pair of bearings 26.

Brake assembly 20 comprises a plurality of driven friction plates 30 interleaved with a plurality of stationary friction plates 32 and an application member 34. The plurality of driven friction plates 30 are adapted to be secured to crankshaft 18 for rotation therewith. The plurality of stationary friction plates 32 are adapted to be secured to fixed member 16 and thus do not rotate. Application member 34 is biased by a spring 36 in order to apply brake assembly 20 by applying pressure to the interleaved driven and stationary friction plates 30 and 32. When it is desired to release brake assembly 20, pressurized hydraulic fluid is supplied to a chamber 38 to move application member 34 against the load exerted by spring 36. A fluid passage 40 extends through brake assembly 20 to facilitate the supply of pressurized hydraulic fluid to chamber 38.

Clutch assembly 22 comprises a plurality of driving friction plates 42 interleaved with a plurality of driven friction plates 44 and a clutch application member 46. The plurality of driving friction plates 42 are adapted to be secured to flywheel 14 for rotation therewith. The plurality of driven friction plates 44 are adapted to be secured to crankshaft 18 for rotation therewith. Application member 46 is biased by a spring 48 in order to disengage clutch assembly 22 by releasing pressure between the interleaved driving and driven friction plates 42 and 44. When it is desired to engage clutch assembly 22, pressurized air is supplied to a chamber 50 to move application member 46 against the load exerted by spring 48 to apply pressure between the driving and driven friction plates 42 and 44. A fluid passage 52 extends through clutch assembly 22 to facilitate the supply of pressurized air to chamber 50.

Figure 2:
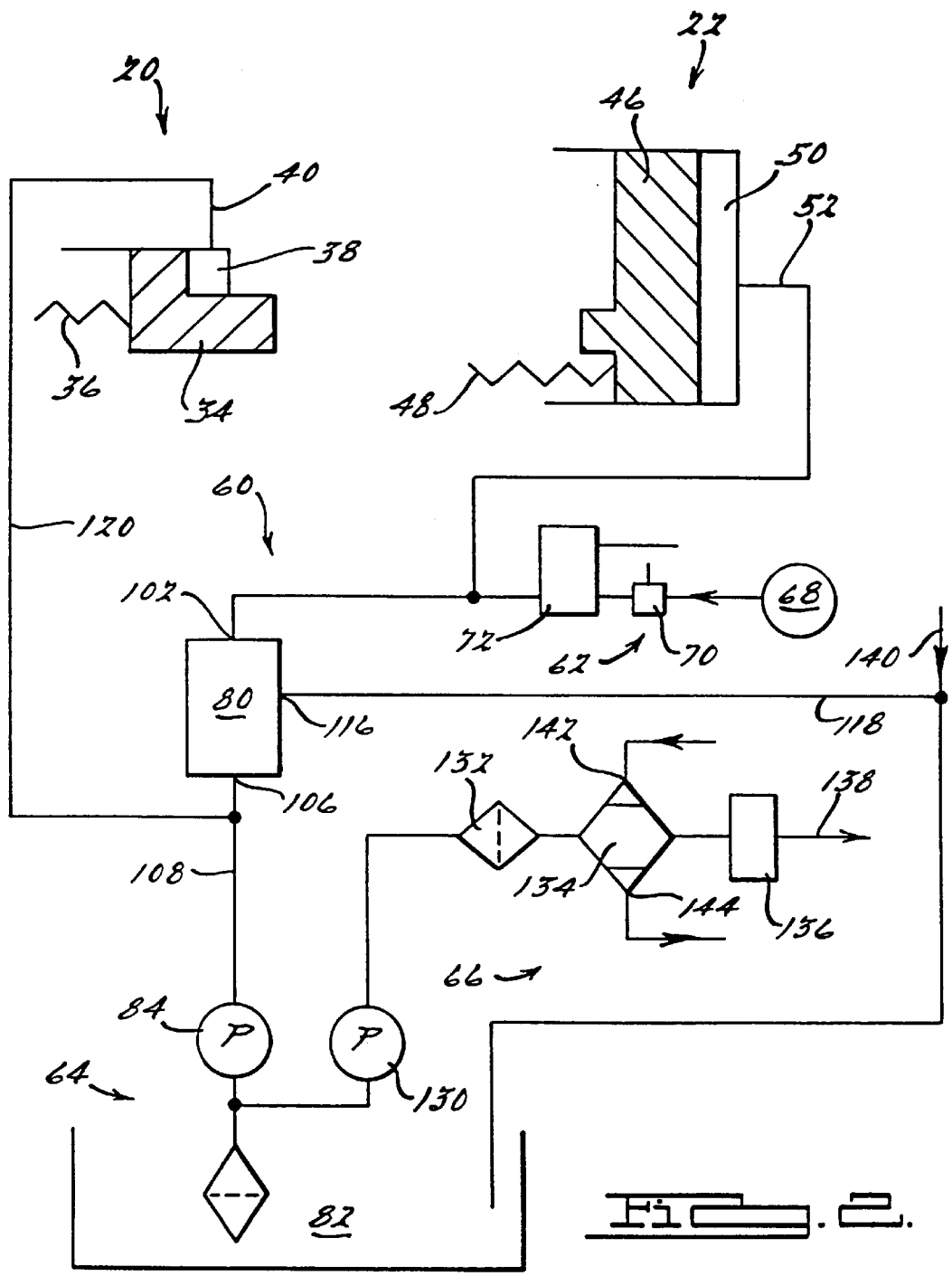
FIG. 2 schematically illustrates the clutch and brake shown in FIG. 1 incorporating the control system according to the present invention.

FIG. 2 schematically illustrates a control system 60 in accordance with the present invention which controls the application/release of brake assembly 20 and the simultaneous engagement/disengagement of clutch assembly 22. Control system 60 permits the hydraulic application/release of brake assembly 20 to be controlled by the pneumatic engagement/disengagement of clutch assembly 22 in order to eliminate the starting and stopping overlap experienced by the prior art pneumatic control systems.

Control system 60 includes a pneumatic system 62, a pressurized hydraulic system 64 and a hydraulic cooling system 66. Pneumatic system 62 is comprised of a source of pressurized air 68, an air pressure regulator 70 and an air valve 72. The activation of air valve 72 allows pressurized air to enter chamber 50 to move application member 46 against the load exerted by spring 48 to engage clutch assembly 22 by applying pressure between the driving and driven friction plates 42 and 44. In the prior art control systems, pressurized air from air valve 72 was also supplied to an air operated brake (not shown) to simultaneously release the air operated brake. This simultaneous operation of clutch assembly 22 and the prior art air operated brake led to both the starting and stopping overlap problems associated with the prior art. The present invention provides pressurized hydraulic system 64 to eliminate the starting and stopping overlap problems and combine a pneumatic system with a hydraulic system with the hydraulic system functioning in response to the operation of the pneumatic system.

Pressurized hydraulic system 64 comprises a brake control valve 80, a source of hydraulic fluid 82 and a hydraulic pump 84 for pumping hydraulic fluid from source 82 to brake control valve 80. Brake control valve 80 is included within system 64 to control the application and release of brake assembly 20 in response to the activation of air valve 72.

Figure 3:
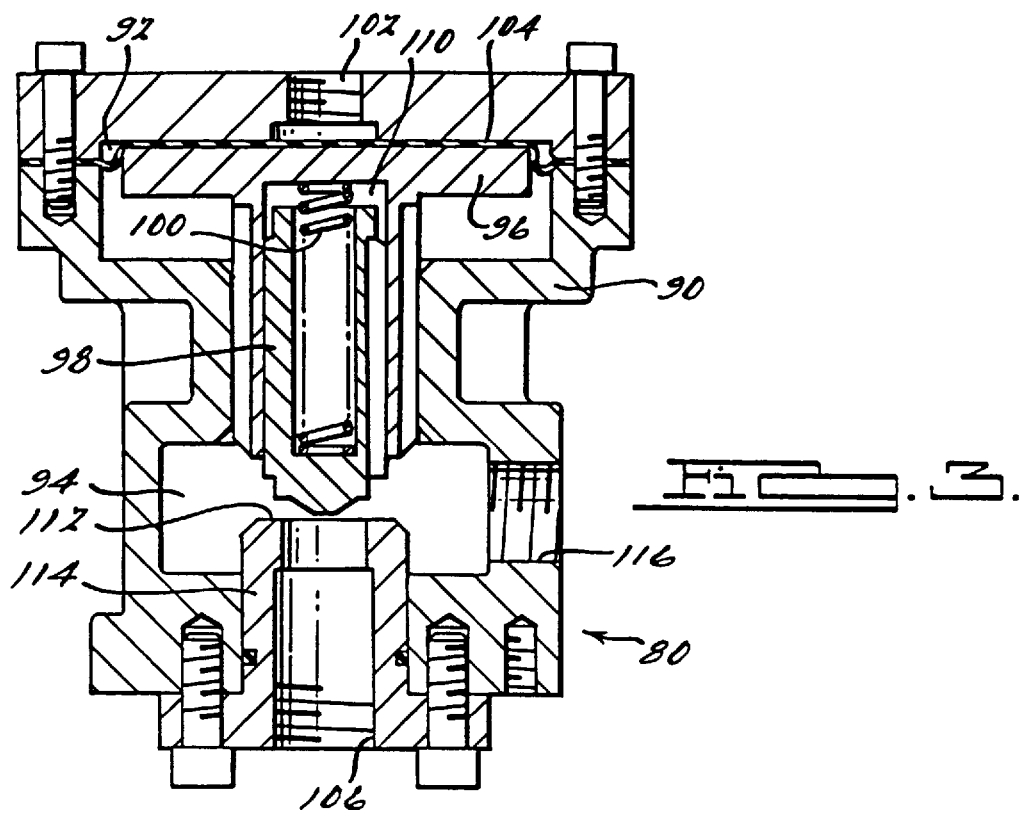
FIG. 3 is a cross section elevational view illustrating the unique brake control valve according to the present invention with the brake control valve in the non-applied condition.
Figure 4:
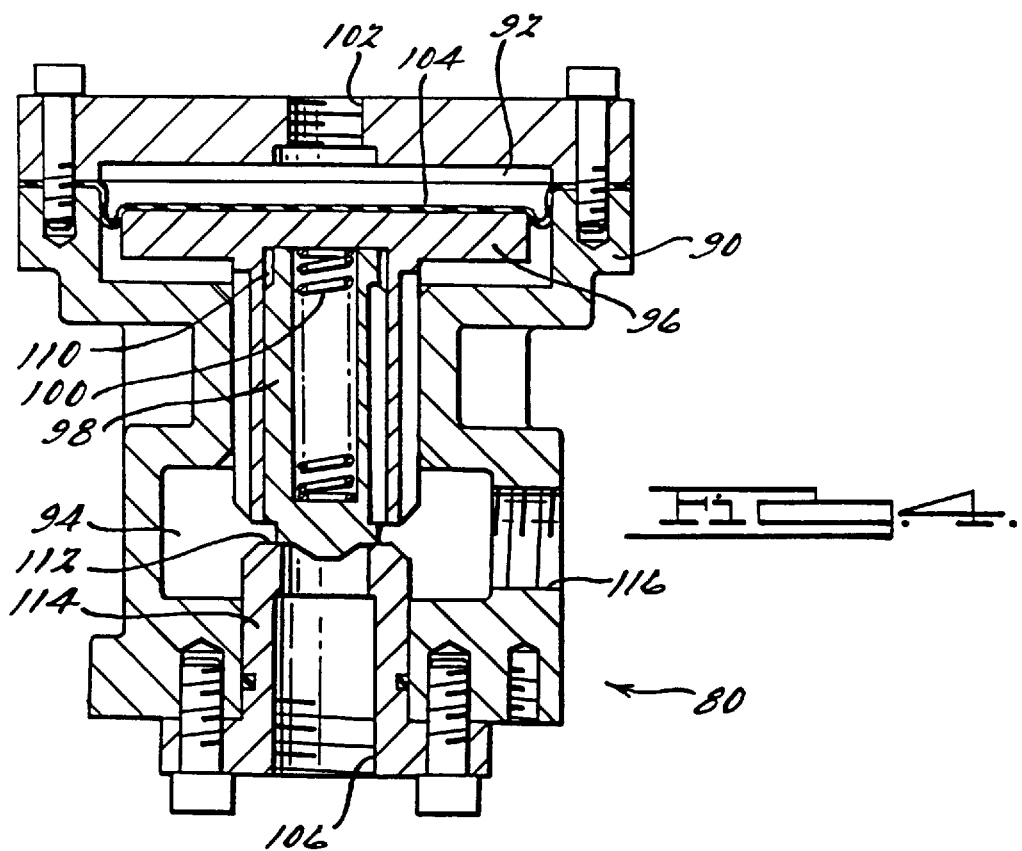
FIG. 4 is a cross section elevational view, similar to FIG. 3, illustrating the unique brake control valve according to the present invention with the brake control valve in the applied condition.

Referring to FIGS. 2, 3 and 4, brake control valve 80 comprises a housing 90, an air chamber 92, a hydraulic fluid chamber 94, a piston 96, a piston or spool 98 and a biasing spring 100. Air chamber 92 includes an inlet port 102 which is in communication with air valve 72 such that air chamber 92 receives pressurized air from source 68 simultaneous to chamber 50. Piston 96 is disposed within fluid chamber 92 and moves axially within chamber 92 due to the air pressure within the upper portion of chamber 92 and the load exerted by biasing spring 100. A rolling diaphragm seal 104 separates the upper portion of chamber 92 from the lower portion of chamber 92 and operates to contain pressurized air from source 68 within the upper portion of chamber 92. Rolling diaphragm seal 104 is used in place of lip seals or O-ring seals between piston 96 and housing 90 in order to eliminate the hysterisis that would normally occur with these other styles of seals.

Hydraulic fluid chamber 94 includes an inlet port 106 which is in communication with hydraulic pump 84 which provides pressurized hydraulic fluid from source 82 to inlet port 106 through a fluid line 108. Piston 96 extends from chamber 92 into chamber 94. Piston 96 defines an internal cavity 110 within which spool 98 and spring 100 are disposed. Spring 100 is disposed between piston 96 and spool 98 to bias piston 96 against the air pressure within the upper portion of chamber 92 and bias spool 98 against a valve seat 112 located on an inlet fitting 114 fixedly and sealingly secured to housing 90. Hydraulic fluid chamber 94 also includes an outlet port 116 which is in communication with hydraulic fluid source 82 through a fluid line 118. A fluid line 120 extends between fluid line 108 which is connected to inlet port 106 and chamber 38 which applies and releases brake assembly 20.

The operation of press 10 and control system 60 begins with brake assembly 20 being in the applied condition due to the biasing of spring 36 and brake control valve 80 being positioned as shown in FIG. 3. Clutch assembly 22 is in the released condition due to the biasing of spring 48. Crankshaft 18 is locked to fixed member 16 and flywheel 14 is free to rotate. Pressurized air from source 68 is not being supplied to chamber 50 due to the deactivation of air valve 72. Pressurized hydraulic fluid is being supplied to inlet port 106 of valve 80 from hydraulic pump 84. Pressurized hydraulic fluid from inlet port 106 enters fluid chamber 94 by unseating spool 98 from valve seat 112. The amount of hydraulic pressure required to unseat spool 98 will be controlled by the strength of biasing spring 100. By maintaining a slight hydraulic pressure within chamber 94 and thus fluid line 120, a slight hydraulic pressure is also maintained in chamber 38. This slight hydraulic pressure operates to keep air out of pressurized hydraulic system 64. Also, the fine-tuning of the operation of press 10 can be accomplished by changing biasing spring 100 to vary the pressure of hydraulic fluid maintained in chamber 38.

When it is desired to connect flywheel 14 to crankshaft 18, air valve 72 is activated which supplies pressurized air to chamber 50 to engage clutch assembly 22. Valve 72 simultaneously supplies the same pressurized air to the upper portion of air chamber 92 of brake control valve 80. Air pressure within the upper portion of chamber 92 moves piston 96 to the position shown in FIG. 4. With piston 96 in the position shown in FIG. 4, pressurized hydraulic fluid from hydraulic source 82 through hydraulic pump 84, fluid line 108 and fluid inlet port 106 must now not overcome the load on spool 98 exerted by spring 100, it must overcome the load exerted on spool 98 by piston 96. The size of piston 96 and the size of valve seat 112 are chosen such that pressurized hydraulic fluid from pump 84 is unable to unseat spool 98 when the air pressure within the upper portion of chamber 92 reaches the air pressure which will begin engagement of clutch assembly 22. In the example described above, pressurized fluid from pump 84 would continue to unseat spool 98 from valve seat 112 until the air pressure within chamber 92 reaches approximately 10 psi. When the air pressure within chamber 92 reaches or exceeds 10 psi, the pressurized hydraulic fluid from pump 84 will not be great enough to unseat spool 98 from valve seat 112. With the hydraulic pressure from pump 84 unable to unseat spool 98 from valve seat 112, pressurized hydraulic fluid from pump 84 will be provided to chamber 38 through fluid line 120 to immediately release brake assembly 20. The immediate release of brake assembly 20 will thus eliminate any starting overlap.

In a similar manner, brake assembly 20 will remain released until the air pressure within the upper portion of chamber 92 is reduced to the point that pressurized hydraulic fluid from pump 84 is again able to unseat spool 98 from valve seat 112. In the example given above, spool 98 will remain seated against valve seat 112 until the air pressure within the upper portion of chamber 92 reduces to approximately 10 psi. At this pressure, pressurized hydraulic fluid from hydraulic pump 84 will again unseat spool 98 from valve seat 112 and the pressurized hydraulic fluid from pump 84 will dump to source 82 through fluid line 118. This dumping of hydraulic fluid will immediately reduce the pressure of fluid within chamber 38 allowing springs 36 to again apply brake assembly 20. The immediate application of brake assembly 20 due to the fluid pressure dump will thus eliminate any stopping overlap.

Thus, it can be seen that the starting and stopping overlap can be eliminated by incorporating brake control valve 80 and providing the source of hydraulic fluid 82 and hydraulic pump 84. The incorporation of brake control valve 80 successfully weds pneumatic system 62 with hydraulic system 64.

Brake assembly 20, in the preferred embodiment, is an oil-shear brake assembly. Oil-shear brake assembly 20 maintains a positive oil film between the disc surfaces of interleaved driven and stationary friction plates 30 and 32. Torque is transmitted between plates 30 and 32 due to the viscous shearing of this oil film. The result is that the wear of the friction surfaces is greatly reduced and heat is dissipated by circulating oil for fast cycle capability. Hydraulic cooling system 66 is included within control system 60 to provide continuous cooling oil to oil-shear brake assembly 20.

Hydraulic cooling system 66 includes an additional pump 130, a filter 132, a heat exchanger 134 and a flow switch 136. Hydraulic fluid from source 82 is pumped by pump 130 through filter 132, through heat exchanger 134, through flow switch 136 to oil-shear brake assembly 20 through a fluid line 138. The hydraulic fluid returns from oil-shear brake assembly 20 via a fluid line 140 which is in communication with fluid line 118 which leads back to source 82. Fluid lines 138 and 140 are placed in communication with the interior cavity of oil-shear brake assembly 20 by means known well in the art. Heat exchanger 134 includes an inlet 142 and an outlet 144 for a cooling medium, normally water, to circulate through heat exchanger 134 to remove heat from the hydraulic fluid from source 82 going to oil-shear brake assembly 20. Thus, the same source of hydraulic fluid 82 can be utilized to apply and release brake assembly 20 as well as provide cooling hydraulic fluid for the oil shear principle incorporated into brake assembly 20.

While the above detailed description describes the preferred embodiment of the present invention, it should be understood that the present invention is susceptible to modification, variation and alteration without deviating from the scope and fair meaning of the subjoined claims.

What is claimed is:

1. A control valve comprising:

a housing defining a fluid passage;

a first piston movable within said housing between a closed position and an open position in response to a first pressurized fluid and in the absence of said first pressurized fluid, respectively, said first piston defining a piston bore;

a second piston movable within said piston bore between a closed position where said fluid passage is closed and an open position where said fluid passage is open in response to a second pressurized fluid; and a spring only for biasing said second piston away from said first piston in the absence of said first pressurized fluid, said second piston being biased into said closed position solely by said first pressurized fluid acting on said first piston when said first piston moves along said second piston until said first piston abuts said second piston to move said second piston to said closed position.

2. The control valve according to claim 1 wherein, said housing includes a first inlet for said first pressurized fluid, a second inlet for said second pressurized fluid and a fluid outlet in communication with said second fluid inlet.

3. The control valve according to claim 2 wherein, said second piston is movable between said closed position where fluid flow between said second inlet and said outlet is prohibited and said open position where fluid flow between said second inlet and said outlet is permitted.

4. The control valve according to claim 2 wherein, said housing defines a first fluid chamber, said first piston being movable within said first fluid chamber between said closed and said open positions.

5. The control valve according to claim 4 wherein, said housing defines a second fluid chamber, said second piston being movable within said second fluid chamber between said closed position and said open position.

6. The control valve according to claim 5 wherein, said second piston is biased against a valve seat to close said second inlet when said second piston is in said closed position.

\* \* \* \* \*

UNITED STATES PATENT AND TRADEMARK OFFICE
CERTIFICATE OF CORRECTION

PATENT NO. : 5,833,210
DATED : November 10, 1998
INVENTOR(S) : Gordon M. Sommer

It is certified that error appears in the above-identified patent and that said Letters Patent is hereby corrected as shown below:

Col. 2, line 20, after "is" insert --capable of eliminating the overlap between the clutch and the brake during both the--

Signed and Sealed this

Twenty-third Day of March, 1999

Attest:

Q. TODD DICKINSON

*Attesting Officer*          *Acting Commissioner of Patents and Trademarks*